(12) United States Patent
Jung et al.

(10) Patent No.: US 7,925,207 B2
(45) Date of Patent: Apr. 12, 2011

(54) RANGING METHOD AND APPARATUS IN A COMMUNICATION SYSTEM WITH RELAY STATION, AND SYSTEM THEREOF

(75) Inventors: Young-Ho Jung, Suwon-si (KR); Yung-Soo Kim, Seongnam-si (KR); Cheol-Woo You, Seoul (KR)

(73) Assignee: Samsung Electronics Co., Ltd (KR)

( * ) Notice: Subject to any disclaimer, the term of this patent is extended or adjusted under 35 U.S.C. 154(b) by 664 days.

(21) Appl. No.: 11/851,922

(22) Filed: Sep. 7, 2007

(65) Prior Publication Data

US 2008/0064329 A1    Mar. 13, 2008

(30) Foreign Application Priority Data

Sep. 7, 2006  (KR) .................. 10-2006-0086217

(51) Int. Cl.
*H04B 7/15* (2006.01)
(52) U.S. Cl. ....... 455/11.1; 455/13.1; 370/279; 370/315
(58) Field of Classification Search ............. 455/3.02, 455/427, 7, 11.1, 12.1, 13.1, 13.2, 16; 370/226, 370/293, 246, 274, 279, 315, 316, 492, 501
See application file for complete search history.

(56) References Cited

U.S. PATENT DOCUMENTS

| | | | | |
|---|---|---|---|---|
| 4,510,496 | A * | 4/1985 | Ross | 342/21 |
| 5,619,504 | A * | 4/1997 | Van Grinsven et al. | 370/347 |
| 2003/0016168 | A1 * | 1/2003 | Jandrell | 342/357.12 |
| 2005/0041573 | A1 | 2/2005 | Eom et al. | |
| 2005/0078737 | A1 * | 4/2005 | Craig et al. | 375/132 |
| 2005/0201449 | A1 * | 9/2005 | Churan | 375/149 |
| 2007/0268780 | A1 * | 11/2007 | Moore | 367/21 |
| 2010/0009624 | A1 | 1/2010 | Youn et al. | |
| 2010/0027462 | A1 | 2/2010 | Lee et al. | |

FOREIGN PATENT DOCUMENTS

| | | |
|---|---|---|
| KR | 1020040061056 | 7/2004 |
| KR | 1020060063276 | 6/2006 |
| KR | 1020070090431 | 9/2007 |

* cited by examiner

*Primary Examiner* — Dominic E Rego
(74) *Attorney, Agent, or Firm* — The Farrell Law Firm, P.C.

(57) ABSTRACT

A method for performing ranging by a mobile station in a communication system. The method includes transmitting a ranging sequence to a relay station; receiving an added signal of a reference sequence of the relay station and the ranging sequence, from the relay station; performing a correlation operation on each of the ranging sequence and the reference sequence in the added signal; estimating a time difference between the ranging sequence and the reference sequence depending on the correlation operation; and transmitting the signal to the relay station taking the time difference into account.

7 Claims, 7 Drawing Sheets

RANGING METHOD AND APPARATUS IN A COMMUNICATION SYSTEM WITH RELAY STATION, AND SYSTEM THEREOF

PRIORITY

This application claims priority under 35 U.S.C. §119(a) to a Korean Patent Application filed in the Korean Intellectual Property Office on Sep. 7, 2006 and assigned Serial No. 2006-86217, the disclosure of which is incorporated herein by reference.

BACKGROUND OF THE INVENTION

1. Field of the Invention

The present invention generally relates to a communication system, and in particular, to a ranging apparatus and method of a mobile station in a communication system with a relay station, and a system thereof.

2. Description of the Related Art

Generally, in a communication system, a mobile station performs a ranging procedure for synchronization information acquisition, power calibration, bandwidth allocation request, and the like. Types of the ranging are classified into initial ranging, maintenance ranging (also known as 'periodic ranging'), and bandwidth request ranging.

A description will now be made of conventional ranging.

Initial ranging is performed to set a correct timing offset between a mobile station and a base station, and to calibrate transmission power.

Periodic ranging is periodically performed by the mobile station to adjust its channel condition with the base station.

The bandwidth request ranging is performed by the mobile station to make a request for bandwidth allocation to perform actual communication with the base station.

FIG. 1 shows initial ranging between a base station and a mobile station in a conventional communication system.

In FIG. 1, a Base Station (BS) 100 receives a ranging sequence #1 102 and a ranging sequence #2 104 from a Mobile Station (MS) 120 and an MS 140, respectively. The BS 100 receives the ranging sequence #1 102 and the ranging sequence #2 104 at different times. Therefore, the BS 100 estimates a delay for timing offset calibration of ranging sequences from each of the MSs 120 and 140, and sends control messages 106 and 108 to the MSs 120 and 140 based on the estimated delay, respectively. The control messages 120 and 140 are provided to control the MSs 120 and 140 to transmit a signal in advance of or behind a unit time. Therefore, upon receipt of the control messages 106 and 108, the MSs 120 and 140 each transmit a signal to the BS 100 at a time in advance of or behind a particular time.

Communication systems are currently evolving from $3^{rd}$ generation mobile communication systems into $4^{th}$ generation mobile communication systems. Research on a $4^{th}$ generation mobile communication system is being conducted for an increase in system capacity and extension of radio coverage, or cell coverage. A multi-hop scheme has been proposed for increasing system capacity increase and extending cell coverage. When a channel condition between a BS and a MS is poor, the proposed multi-hop scheme can install a relay station between the BS and the MS to form a multi-hop relay path via the relay station. In this manner, the MS can receive a wireless channel having a good channel condition. In addition, as the multi-hop scheme allows the MS located inside or outside the cell boundary where the channel condition is poor to use the multi-hop relay scheme, the MS can receive a higher-rate data channel and contribute to extension of the cell coverage of the system.

As described above, communication systems are evolving into systems employing a relay station for increasing system capacity and extending cell coverage. However, current conventional ranging procedures are for communication systems with no relay station and, currently, there is no ranging procedure for a communication system with a relay station. Therefore, a need exists for a ranging apparatus and method of a mobile station in a communication system with a relay station, and a system thereof.

SUMMARY OF THE INVENTION

The present invention addresses at least the above-described problems and/or disadvantages and provides at least the advantages described below. Accordingly, an aspect of the present invention is to provide a ranging procedure in a communication system with a relay station.

Another aspect of the present invention is to provide a ranging method for reducing a control overhead in a communication system with a relay station.

Another aspect of the present invention is to provide a method for calibrating a timing offset for direct ranging by a mobile station in a communication system with a relay station.

According to an aspect of the present invention, there is provided a ranging control method of a relay station in a communication system. The method includes receiving a ranging sequence from a mobile station; adding up the ranging sequence and a reference sequence that the relay station uniquely uses; and transmitting the added signal to the mobile station.

According to another aspect of the present invention, there is provided a ranging control method of a relay station in a communication system. The method includes receiving a ranging sequence from a mobile station; estimating a timing offset indicative of a difference between a reception time of the ranging sequence and a reference time; performing decoding and regeneration on the ranging sequence, and adding up the ranging sequence and a reference sequence that a base station uniquely uses; and transmitting the added signal to the mobile station.

According to further another aspect of the present invention, there is provided a method for performing ranging by a mobile station in a communication system. The method includes transmitting a ranging sequence to a relay station; receiving an added signal of a reference sequence of the relay station and the ranging sequence, from the relay station; performing a correlation operation on each of the ranging sequence and the reference sequence in the added signal; estimating a time difference between the ranging sequence and the reference sequence depending on the correlation operation; and transmitting the signal to the relay station taking the time difference into account.

According to yet another aspect of the present invention, there is provided a communication system for performing ranging. The system includes a relay station; and a mobile station. The relay station receives a ranging sequence from the mobile station, adds up the received ranging sequence and a reference sequence that the relay station uniquely uses, and transmits the added signal to the mobile station, and the mobile station receives the added signal from the relay station, estimates a time difference between the ranging sequence and the reference sequence through a correlation operation, and transmits a signal taking the estimated time difference into account.

According to still another aspect of the present invention, there is provided a ranging apparatus of a relay station. The ranging apparatus includes a receiver for receiving a ranging sequence; a buffer for storing a ranging sequence output from the receiver; a reference sequence generator for generating a reference sequence; and a transmitter for adding up the reference sequence output from the reference sequence generator and the ranging sequence output from the buffer, and multiplying the added signal by a amplification factor before transmission.

According to yet another aspect of the present invention, there is provided a ranging apparatus or a relay station. The ranging apparatus includes a receiver for receiving a ranging sequence; a ranging sequence generator for generating multiple ranging sequences; a reference sequence generator for generating a reference sequence; a correlator for correlating each of the multiple ranging sequences generated from the ranging sequence generator, with the ranging sequence received from the receiver; and a transmitter for adding up the ranging sequences correlated by correlator and the reference sequence generated by the reference sequence generator, and transmitting the added signal.

According to still another aspect of the present invention, there is provided a ranging apparatus of a mobile station. The ranging apparatus includes a receiver for receiving a signal including a ranging sequence; a ranging sequence generator for generating the ranging sequence; a reference sequence generator for generating a reference sequence; a correlator for performing correlation on a signal output from the receiver using the ranging sequence generated by the ranging sequence generator and the reference sequence; and a estimator for estimating a time different between the reference sequence and the ranging sequence output from the correlator.

BRIEF DESCRIPTION OF THE DRAWINGS

The above and other aspects, features and advantages of the present invention will become more apparent from the following detailed description when taken in conjunction with the accompanying drawings in which.

Similar reference characters denote corresponding features consistently throughout the drawings.

DETAILED DESCRIPTION OF THE PREFERRED EMBODIMENTS

Preferred embodiments of the present invention will now be described in detail with reference to the annexed drawings. In the following description, a description of known functions and configurations incorporated herein has been omitted for clarity and conciseness.

The present invention provides a method for performing initial ranging to minimize system overhead in a communication system with a relay station. Although the present invention will be described herein with reference to an initial ranging operation among various ranging operations, the present invention can be applied to other ranging operations, such as periodic ranging and bandwidth request ranging.

Figure 1:
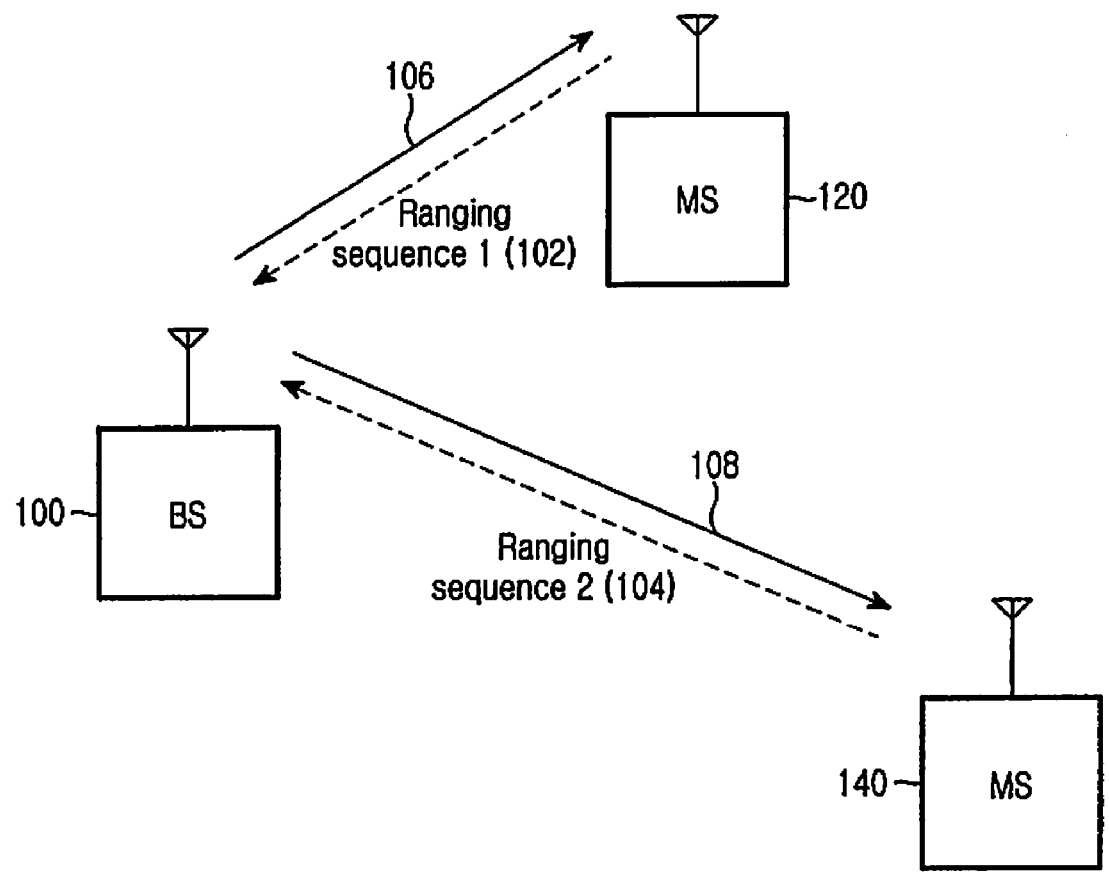
FIG. 1 illustrates initial ranging between a base station and a mobile station in a conventional communication system.
Figure 2:
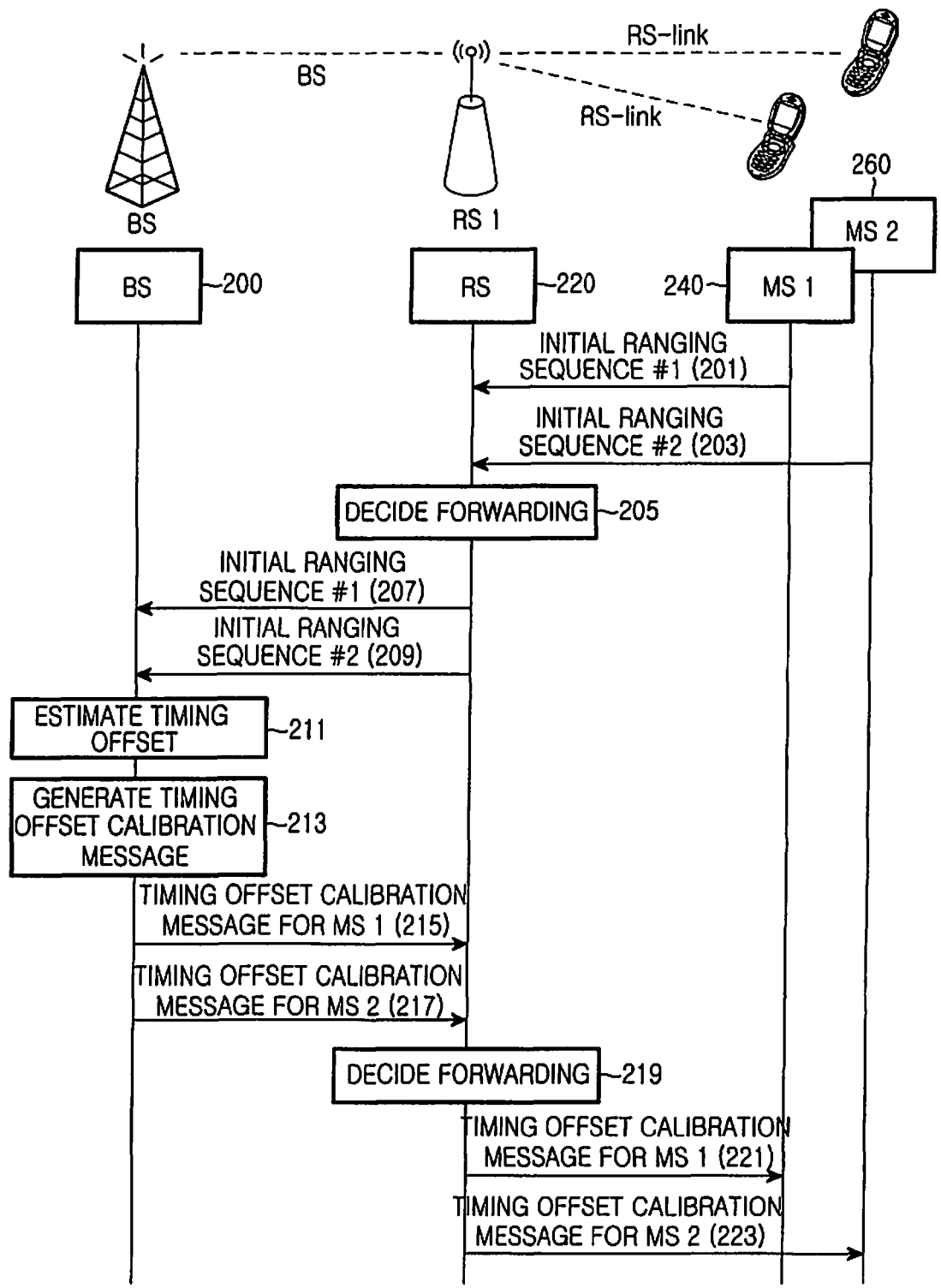
FIG. 2 illustrates an initial ranging procedure in a communication system with a relay station according to a first embodiment of the present invention.

FIG. 2 shows a first example of an initial ranging procedure in a communication system with a relay station according to the present invention.

In FIG. 2, a Mobile Station (MS) #1 240 and an MS #2 260 transmit an initial ranging sequence #1 and an initial ranging sequence #2 to a Relay Station (RS) 220, respectively in steps 201 and 203. The RS 220 decides to forward the received initial ranging sequences to a Base Station (BS) 200 in step 205. As a result, the RS 220 transmits the initial ranging sequence #1 and the initial ranging sequence #2 to the BS 200 in steps 207 and 209.

The BS 200 compares the times the BS 200 has received the initial ranging sequences #1 and #2 with a reference time to estimate timing offsets between the initial ranging sequences and the reference time in step 211. Thereafter, the BS 200 generates timing offset calibration messages to transmit the estimated timing offsets to the MSs 240 and 260 in step 213. The timing offset calibration messages are messages transmitted to the MS #1 240 and the MS #2 260. Therefore, the timing offset calibration messages are divided into a message including timing offset information between the initial ranging sequence #1 and the reference time, and a message including timing offset information between the initial ranging sequence #2 and the reference time. The BS 200 sends the generated timing offset calibration messages to the RS 220 in steps 215 and 217.

The RS 220 decides to forward the received timing offset calibration messages to the MSs 240 and 260 in step 219. As a result, the RS 220 sends the timing offset calibration messages to the MSs 240 and 260, respectively, in steps 221 and 223.

Similar to the conventional procedure, the procedure shown in FIG. 2 uses a control message, or the timing offset calibration message, to perform initial ranging in the communication system with a relay station. A description will now be made of a scheme capable of calibrating a timing offset without using the control message according to different examples of the present invention.

For this, the present invention is based on the following assumptions.

1. A transmission delay between a BS and an RS is time-constant.
2. Each RS uses its own unique reference sequence.
3. Each MS can communicate with only one of the BS and the RS.

Figure 3:
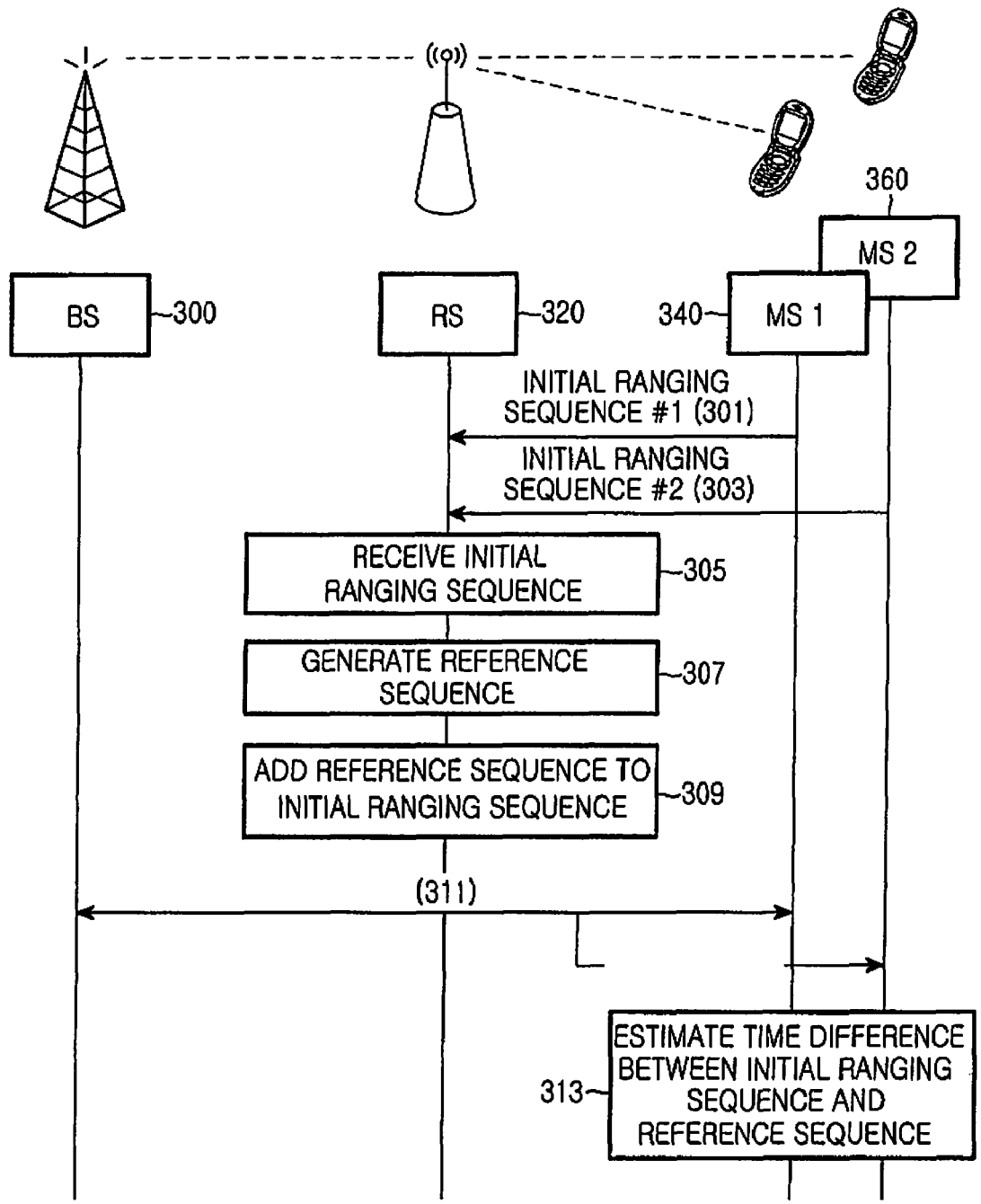
FIG. 3 illustrates an initial ranging procedure according to a second embodiment of the present invention.

FIG. 3 shows a second example of an initial ranging procedure according to the present invention.

Before a description of FIG. 3 is given, in the second example of the present invention, the ranging procedure is divided into the following steps and a signal is relayed according to an 'amplify-and-forward' scheme. The amplify-and-forward scheme as used herein refers to a scheme in which a RS amplifies Radio Frequency (RF) power of a signal and forwards the power-amplified signal to a MS.

Step 1: An MS transmits a ranging sequence.

Step 2: An RS adds up a reference sequence and a ranging sequence taking into account a delay time between the RS and the BS, and forwards the added signal.

Step 3: After receiving the added signal, the MS performs a correlation operation using the reference sequence and the ranging sequence to estimate a time difference.

Step 4: The MS determines a signal transmission time taking the estimated time difference into consideration.

Referring to FIG. 3, an MS #1 340 and an MS #2 360 transmit an initial ranging sequence #1 and an initial ranging sequence #2 to an RS 320, respectively, in steps 310 and 303.

After receiving the initial ranging sequences, the RS 320 temporarily stores the received initial ranging sequences in a buffer in step 305. The RS 320 generates a reference sequence uniquely allocated to the RS 320 in step 307. The RS 320 adds the reference sequence to the initial ranging sequences taking timing offsets into account in step 309. The timing offsets between the initial ranging sequences and the reference sequence herein are determined taking into account (i) a transmission delay having a time-constant characteristic between a base station and a relay station, (ii) a reference time difference, and (iii) a data reception time used by the base station.

The RS 320 decides to amplify-and-forward the added sequence of the initial ranging sequences and the reference sequence, and transmits the added sequence to a BS 300 and the MSs 340 and 360 in step 311. The RS 320 can transmit the signal to the BS 300 at an uplink signal transmission time, and can transmit the signal to the MSs 340 and 360 at a downlink signal transmission time. Alternatively, the RS 320 can transmit the signal regardless of the uplink/downlink signal transmission time using an omni-directional antenna. The transmission to the BS 300 is not mandatory.

The MSs 340 and 360 each correlate their initial ranging sequences from the signal received from the RS 320 with a pre-recognized reference sequence, to estimate reception times of the sequences in step 313. The MSs 340 and 360 each compensate for time differences between their initial ranging sequences and the reference sequence, and then transmit the signals.

Figure 4:
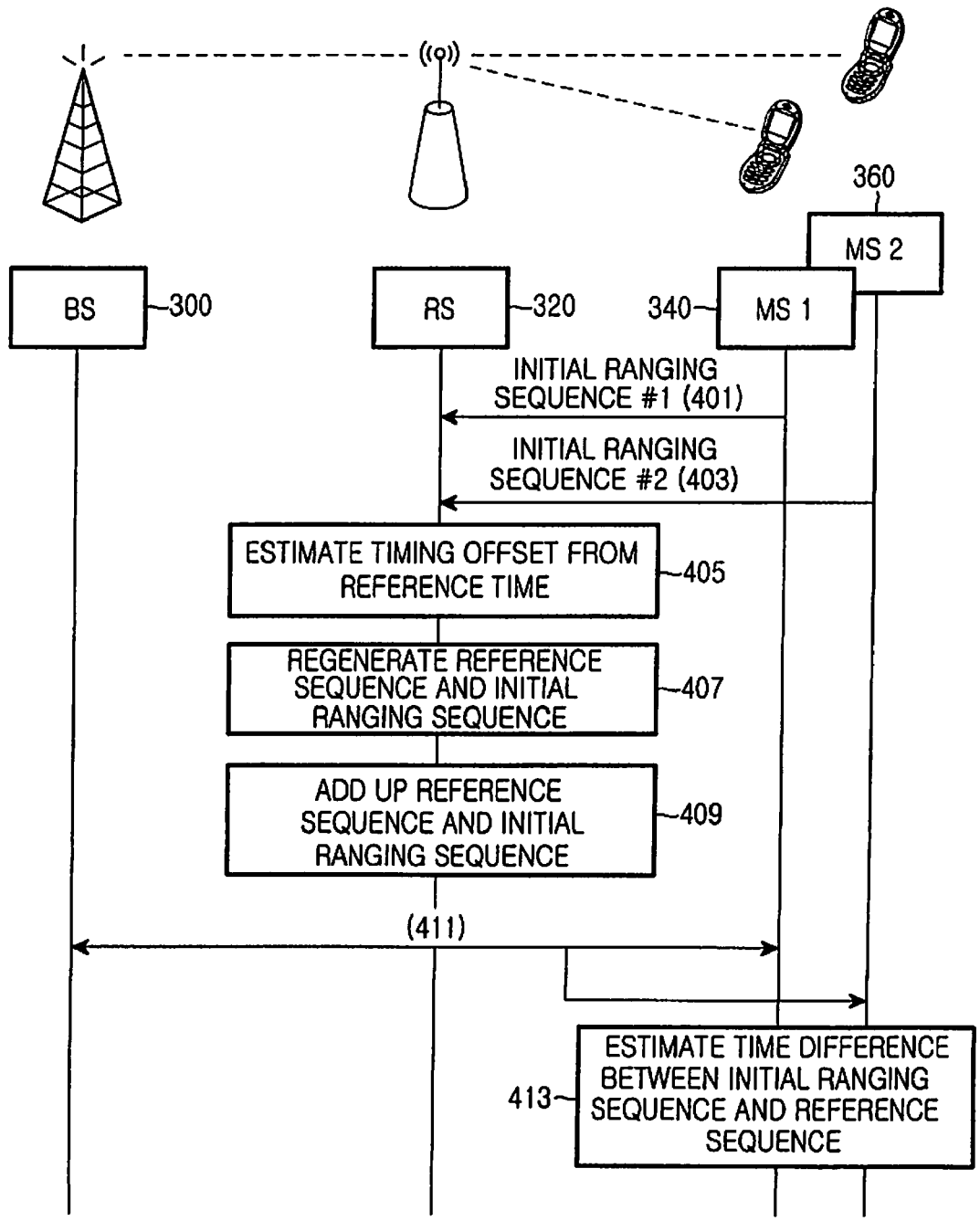
FIG. 4 illustrates an initial ranging procedure according to a third embodiment of the present invention.

FIG. 4 shows a third example of an initial ranging procedure according to the present invention.

Before a description of FIG. 4 is given, in the third example of the present invention, an RS, upon receipt of a ranging sequence from an MS, decodes the received ranging sequence to detect a type and reception timing of the ranging sequence. That is, in the third example, the RS relays the signal using a decoding-and-forward scheme. The 'decoding-and-forward scheme' as used herein refers to a scheme in which the relay station decodes a received signal to perform error detection, and forwards the signal after re-encoding the error-detected signal.

Therefore, in the third example of the present invention, the ranging procedure is divided into the following steps in particular, the third example is different from the second example in step 2 and step 3, as shown below.

Step 1: Each MS transmits a ranging sequence.

Step 2: An RS detects a type and timing of the ranging sequence.

Step 3: The RS adds up regenerated ranging sequences and a reference sequence taking into account a delay time between the RS and the BS, and forwards the added signal. The 'regenerated ranging sequence' as used herein refers to a signal that the RS has generated by decoding a ranging sequence received from the MS, performing error detection thereon, and then re-encoding the error-detected signal.

Step 4: Each MS estimates a time difference between the reference sequence and its transmitted ranging sequence by performing a correlation operation on a received signal.

Step 5: Each MS determines a signal transmission time taking the estimated time difference into account.

Referring to FIG. 4, an MS #1 340 and an MS #2 360 transmit an initial ranging sequence #1 and an initial ranging sequence #2 to an RS 320, respectively, in steps 401 and 403.

After receiving the initial ranging sequences, the RS 320 estimates a timing offset, or a difference between a reference time and a reception time for each of the initial ranging sequences in step 405. The RS 320 generates a reference sequence uniquely used in the RS 320, and regenerates initial ranging sequences of the MSs 340 and 360 in step 407. The RS 320 adds up the regenerated initial ranging sequences and the reference sequence taking the estimated timing offsets into account in step 409.

The RS 320 transmits the added signal to the BS 300 and the MSs 340 and 360 in step 41. The RS 320 can transmit the signal to the BS 300 at an uplink signal transmission time, and can transmit the signal to the MSs 340 and 360 at a downlink signal transmission time. Alternatively, the RS 320 can transmit the signal regardless of the uplink/downlink signal transmission time using an omni-directional antenna. The transmission to the BS 300 is not mandatory.

The MSs 340 and 360 each correlate their initial ranging sequences from the signal received from the RS 320 with a pre-recognized reference sequence, to estimate time differences between the reference sequence and the initial ranging sequences in step 413. Thereafter, the MSs 340 and 360 each compensate for time differences between their initial ranging sequences and the reference sequence, and then transmit the signals.

Figure 5:
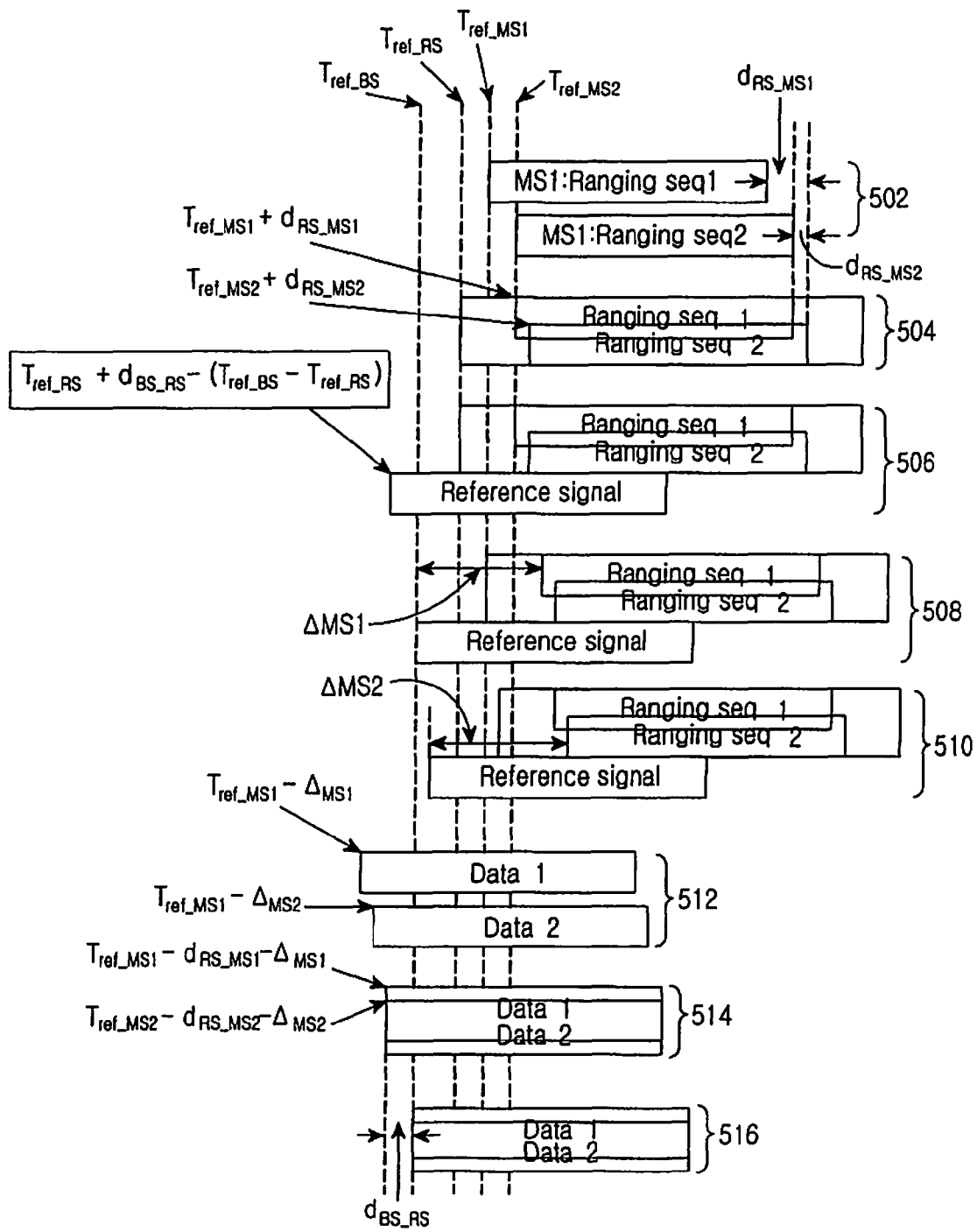
FIG. 5 illustrates signal transmission/reception based on sequence addition and time difference estimation according to the second and third embodiments of the present invention.

With reference to FIG. 5, a description will now be made of the operation in which the relay station adds up the initial ranging sequences and the reference sequence and transmits the added signal according to the second and third examples of the present invention.

FIG. 5 shows signal transmission/reception based on sequence addition and time difference estimation according to the second and third examples of the present invention.

In FIG. 5, an MS #1 and an MS #2 transmit a ranging sequence #1 (ranging seq 1) and a ranging sequence #2 (ranging seq 2) to an RS at their reference times $T_{ref\_MS1}$ and $T_{ref\_MS2}$, respectively, in step 502. The RS buffers a received signal obtained in such a manner that the ranging sequence #1 and the ranging sequence #2 are added up after being delayed by transmission delay times $D_{RS\_MS1}$ and $D_{RS\_MS2}$ between the RS and the MSs in step 504.

The RS adds up the buffered received signal and the reference sequence, and transmits the added signal to the BS and the MSs #1 and #2 in step 506. An insertion time of the reference sequence is given such as $T_{ref\_RS} - d_{BS\_RS} - (T_{ref\_BS} - T_{ref\_RS})$, where $T_{ref\_RS}$ and $T_{ref\_BS}$ denote reference times of the RS and the BS, respectively, and $d_{BS\_RS}$ denotes a transmission delay between the BS and the RS.

The MS #1 correlates the known ranging sequence #1 of MS #1 with the added signal to estimate a reception time of the ranging sequence #1, and to detect a timing offset $\Delta MS1$ between the ranging sequence #1 and the reference sequence in step 508. The MS #2 correlates the known ranging sequence #2 of MS #2 with the added signal to estimate a reception time of the ranging sequence #2, and to detect a timing offset $\Delta MS2$ between the ranging sequence #2 and the reference sequence in step 510.

The MSs #1 and #2 calibrate their transmission times taking the timing offsets into consideration, and then transmit the data to the RS in step 512.

As a result, the RS receives the data of the MS #1 and the MS #2 at the same time in step 514. The BS also receives the data of the MSs #1 and #2, relayed by the RS, at the same time in step 516.

Figure 6:
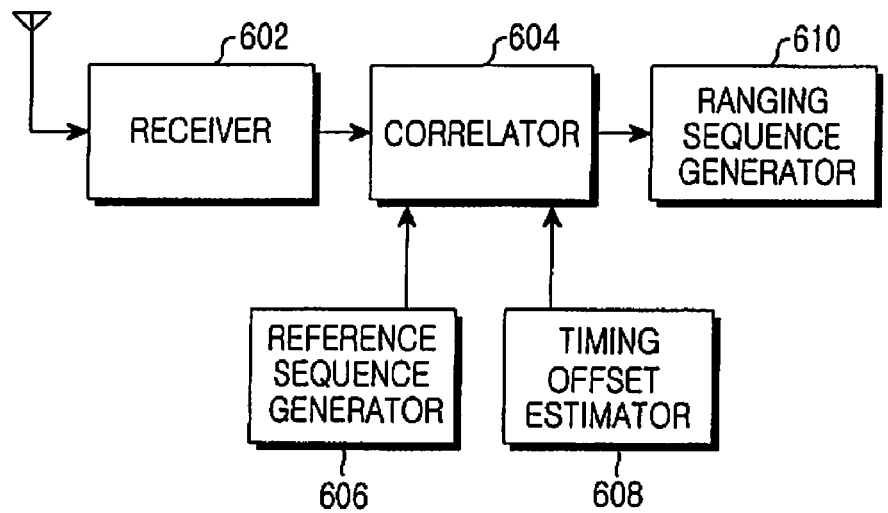
FIG. 6 is a block diagram of a mobile station according to an embodiment of the present invention.

FIG. 6 shows an MS according to the present invention.

In FIG. 6, a receiver 602 of the MS receives an added signal of a reference sequence and ranging sequences, from an RS. The received signal is input to a correlator 604 after undergoing a processing procedure. The correlator 604 performs correlation between a ranging sequence unique to the MS, generated from a ranging sequence generator 606, and a reference sequence generated from a reference sequence generator 608. By performing the correlation, the correlator 604 detects a reference sequence and a ranging sequence, and a timing offset estimator 610 estimates a timing offset between the reference sequence and the ranging sequence.

Figure 7:
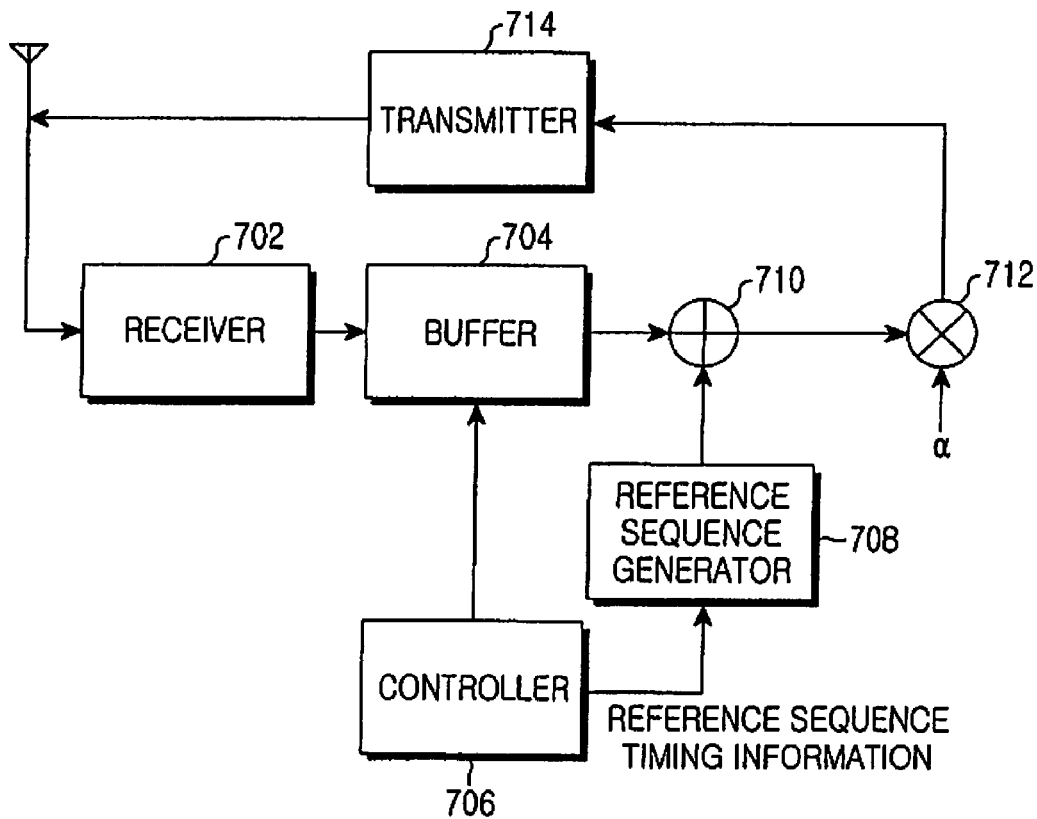
FIG. 7 is a block diagram of a relay station according to the second embodiment of the present invention.

FIG. 7 shows an RS according to the second example of the present invention.

In FIG. 7, a receiver 702 of the RS receives a ranging sequence from an MS, and outputs the received ranging sequence to a buffer 704. The buffer 704 stores therein the received signal, and a controller 706 outputs reference sequence timing information to a reference sequence generator 708 to control a reference sequence generation time. The reference sequence generator 708 generates a reference sequence, and the generated reference sequence is added to the ranging sequence in the buffer 704 by means of an adder 710.

The added signal is multiplied by a by means of a multiplier 712, where α denotes an amplification factor in the RS using the amplify-and-forward scheme. The multiplied signal is input to a transmitter 714, and the transmitter 714 transmits the added signal of the reference sequence and the ranging sequence, to the MS.

Figure 8:
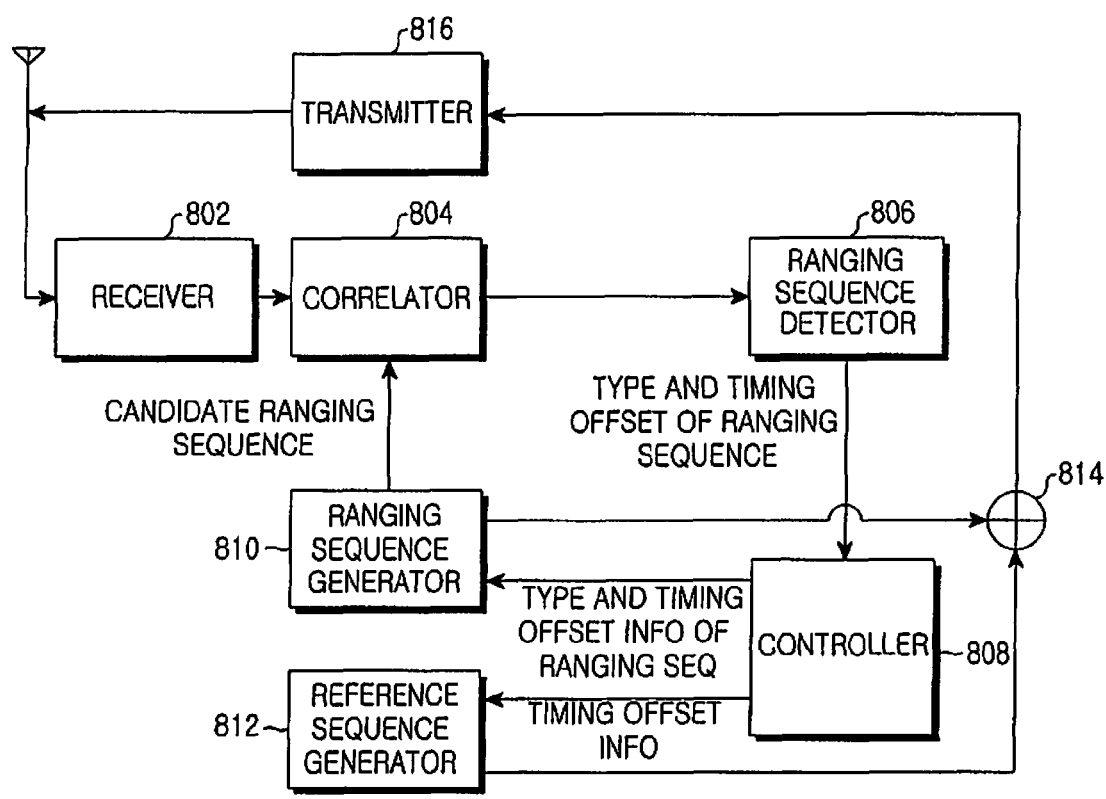
FIG. 8 is a block diagram of a relay station according to the third embodiment of the present invention.

FIG. 8 shows an RS according to the third example of the present invention.

In FIG. 8, a receiver 802 of the RS receives a ranging sequence from an MS, and outputs the received ranging sequence to a correlator 804. The ranging sequence herein can be either a single ranging sequence transmitted only by the MS, or an added ranging sequence of the ranging sequence and another ranging sequence transmitted by another MS. The correlator 804 performs correlation between a ranging sequence candidate of the MS, generated by a ranging sequence generator 810, and the received signal. The correlator 804 outputs the correlation result to a ranging sequence detector 806.

The ranging sequence detector 806 detects a ranging sequence of the MS among the ranging sequence candidates, and detects timing information of the detected ranging sequence. Type and timing information of the detected ranging sequence are input to a controller 808. The controller 808 outputs timing information for controlling type and generation time of a ranging sequence, to the ranging sequence generator 810. In addition, the controller 808 controls generation and generation time of the reference sequence. For this, a reference sequence generator 812 is controlled by the controller 808.

The generated reference sequence is added to the ranging sequence by an adder 814, and then input to a transmitter 816. The transmitter 816 transmits the added signal of the reference sequence and the ranging sequence, to the MS.

As can be appreciated from the foregoing description, the present invention provides a ranging procedure for a communication system with a relay station. In addition, according to the present invention, an MS can spontaneously calibrate ranging offset timing, thereby contributing to a reduction in overhead due to control message exchange.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A ranging control method of a relay station in a communication system, the method comprising:
receiving a ranging sequence from at least one mobile station;
estimating a timing offset indicative of a difference between a reception time of the received ranging sequence and a reference time;
regenerating a ranging sequence corresponding to the at least one mobile station using the received ranging sequence, and adding up the regenerated ranging sequence and a reference sequence; and
transmitting the added sequence to the at least one mobile station taking into account at least one of a time that a base station desires to receive a signal, a signal delay time between the base station and the relay station, a base station reference time, and a relay station reference;
wherein regenerating a ranging sequence comprises decoding the received ranging sequence, detecting an error from the decoded ranging sequence, and if the error is detected from the decoded ranging sequence, regenerating the ranging sequence by re-encoding the decoded ranging sequence.

2. The ranging control method of claim 1, wherein the received ranging sequence includes one of an initial ranging sequence, a periodic ranging sequence, and a bandwidth request ranging sequence.

3. A ranging apparatus of a relay station, the apparatus comprising:
a receiver for receiving a ranging sequence from at least one mobile station;
a buffer for storing the received ranging sequence;
a reference sequence generator for regenerating a ranging sequence corresponding to the at least one mobile station using the received ranging sequence; and
a transmitter for adding up the regenerated ranging sequence and a reference sequence, transmitting the added sequence to the at least one mobile station,
wherein the transmitter transmits to the at least one mobile station the added sequence taking into account at least one of a time that a base station desires to receive a signal, a signal delay time between the base station and the relay station, a base station reference time, and a relay station, a base station reference time, and a relay station reference;
wherein regenerating a ranging sequence comprises decoding the received ranging sequence, detecting an error from the decoded ranging sequence, and if the error is detected from the decoded ranging sequence, regenerating the ranging sequence by re-encoding the decoded ranging sequence.

4. The communication system of claim 3, wherein the received ranging sequence includes one of an initial ranging sequence, a periodic ranging sequence, and a bandwidth request ranging sequence.

5. The ranging apparatus of claim 3, further comprising:
a controller for controlling a reference sequence generation time of the reference sequence generator.

6. The ranging apparatus of claim 3, further comprising:

a ranging sequence generator for generating multiple ranging sequences; and a correlator for correlating each of the multiple ranging sequences with the regenerated ranging sequence.

7. The ranging apparatus of claim 6, wherein the transmitter adds up the ranging sequences correlated by the correlator and the reference sequence, and transmits the added sequence to the at least one mobile station.

* * * * *